United States Patent
Kennedy (10) Patent No.: US 12,348,894 B2
(45) Date of Patent: *Jul. 1, 2025

(54) DATA SEGMENT SERVICE

(71) Applicant: Comcast Cable Communications, LLC, Philadelphia, PA (US)

(72) Inventor: Christopher J. Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,269

(22) Filed: Feb. 22, 2024

(65) Prior Publication Data

US 2024/0195932 A1    Jun. 13, 2024

Related U.S. Application Data

(60) Continuation of application No. 17/947,736, filed on Sep. 19, 2022, now Pat. No. 11,937,010, which is a
(Continued)

(51) Int. Cl.
*H04N 5/76*    (2006.01)
*H04N 21/4788*    (2011.01)
(Continued)

(52) U.S. Cl.
CPC ........... *H04N 5/76* (2013.01); *H04N 21/4788* (2013.01); *H04N 21/8456* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 5,659,539 A | 8/1997 | Porter et al. | |
| 5,983,275 A | 11/1999 | Ecclesine | |

(Continued)

FOREIGN PATENT DOCUMENTS

| | | |
|---|---|---|
| EP | 1400969 A1 | 3/2004 |
| EP | 2465262 A1 | 6/2012 |

(Continued)

OTHER PUBLICATIONS

SnappyTV, "Our Company", 2 pages, http://snappytv.com/corp/company.html, retrieved Dec. 10, 2015.
(Continued)

*Primary Examiner* — Daniel T Tekle
(74) *Attorney, Agent, or Firm* — Banner & Witcoff, Ltd.

(57) ABSTRACT

Aspects of the disclosure relate to the delivery of media content over a network. Specifically, aspects are directed to identification and/or extraction of a selected data such as a video clip from content and providing identifying information to a user to retrieve, view, and/or share the selected video clip. Aspects described herein provide the ability to identify a starting point and stopping point of a video clip on a media gateway device and generate a URL that can be used and/or shared in order to access the selected video clip. The URL may identify a stored media clip, or may contain information from which a video clip can be recreated.

28 Claims, 4 Drawing Sheets

Related U.S. Application Data continuation of application No. 13/617,433, filed on Sep. 14, 2012, now Pat. No. 11,451,736, which is a division of application No. 12/964,046, filed on Dec. 9, 2010, now Pat. No. 10,057,535.

(51) Int. Cl.
*H04N 21/845* (2011.01)
*H04N 21/858* (2011.01)

(56) References Cited

U.S. PATENT DOCUMENTS

| | | | |
|---|---|---|---|
| 6,112,226 | A | 8/2000 | Weaver et al. |
| 6,757,027 | B1 | 6/2004 | Edwards et al. |
| 6,871,007 | B1 | 3/2005 | Saeijs et al. |
| 7,886,327 | B2 | 2/2011 | Stevens |
| 8,761,392 | B2 | 6/2014 | Chen et al. |
| 9,338,209 | B1 | 5/2016 | Begen et al. |
| 2005/0210145 | A1* | 9/2005 | Kim .................. G06F 16/743 709/219 |
| 2008/0147608 | A1 | 6/2008 | Sarukkai |
| 2008/0285938 | A1* | 11/2008 | Nakamura ........... H04N 21/845 386/346 |
| 2009/0022473 | A1 | 1/2009 | Cope et al. |
| 2009/0150947 | A1 | 6/2009 | Soderstrom |
| 2009/0172197 | A1 | 7/2009 | Kalaboukis et al. |
| 2009/0279852 | A1 | 11/2009 | Morimoto et al. |
| 2009/0281978 | A1 | 11/2009 | Gordon et al. |
| 2010/0153520 | A1 | 6/2010 | Daun et al. |
| 2011/0231887 | A1 | 9/2011 | West et al. |
| 2011/0239253 | A1 | 9/2011 | West et al. |
| 2011/0265150 | A1 | 10/2011 | Spooner et al. |
| 2012/0017236 | A1 | 1/2012 | Stafford et al. |
| 2012/0096357 | A1 | 4/2012 | Folgner et al. |
| 2012/0148215 | A1 | 6/2012 | Kennedy |
| 2012/0159182 | A1 | 6/2012 | Rouse |
| 2013/0013736 | A1 | 1/2013 | Kennedy |
| 2013/0014138 | A1 | 1/2013 | Bhatia et al. |
| 2013/0174191 | A1 | 7/2013 | Thompson, Jr. et al. |
| 2013/0205321 | A1 | 8/2013 | Sinha et al. |
| 2013/0332834 | A1 | 12/2013 | Li et al. |
| 2014/0006564 | A1 | 1/2014 | Thang et al. |
| 2014/0074855 | A1 | 3/2014 | Zhao et al. |
| 2014/0089992 | A1 | 3/2014 | Varoglu et al. |
| 2014/0150044 | A1 | 5/2014 | Takahashi et al. |
| 2014/0313341 | A1 | 10/2014 | Stribling |
| 2014/0317707 | A1 | 10/2014 | Kim et al. |
| 2015/0106481 | A1 | 4/2015 | Ma et al. |
| 2015/0161360 | A1 | 6/2015 | Paruchuri et al. |
| 2015/0185965 | A1 | 7/2015 | Belliveau et al. |
| 2015/0304692 | A1 | 10/2015 | Gavade et al. |
| 2016/0035392 | A1 | 2/2016 | Taylor et al. |
| 2016/0149956 | A1 | 5/2016 | Birnbaum et al. |
| 2016/0234504 | A1 | 8/2016 | Good et al. |
| 2017/0134810 | A1 | 5/2017 | Kashyap et al. |
| 2017/0339463 | A1 | 11/2017 | Pike et al. |
| 2020/0045384 | A1 | 2/2020 | Nilsson |

FOREIGN PATENT DOCUMENTS

| | | |
|---|---|---|
| KR | 20110117961 A | 10/2011 |
| WO | 2011041088 A1 | 4/2011 |
| WO | 2014100338 A1 | 6/2014 |

OTHER PUBLICATIONS

Pantos, R. and W. May. "HTTP Live Streaming draft-pantos-http-live-streaming-14." Published by the Internet Engineering Task Force (IETF) dated Oct. 14, 2014, 94 pages.
IFrame—Inline Frame, Web Design Group, retrieved May 15, 2015, 2 pages.
M3U, Wikipedia, http://en.wikipedia.org/wiki/M3U, retrieved Mar. 12, 2015, 6 pages.
Shazam, iTunes Store, http://itunes.apple.com/us/app/shazam/id28499359?mt=8, retrieved May 19, 2015, 3 pages.
HTTP Live Streaming Overview, Apple Inc., 39 pages, dated Feb. 11, 2014.
TV Moments Worth Sharing, MemeTV, https://memtv.com/, retrieved May 19, 2015, 7 pages.
Lunden, Ingrid. ConnecTV Acquires TweeTV to Add Real-Time Analytics to its Social TV Platform, http://techcrunch.com/2014*06/30/connectv-acquires-tweettv-to-add-real-time-analytics-to-its-social-tv-platform/, dated Jun. 30, 2014, 6 pages.
HTTP Live Streaming, Apple Developer, Apple Inc., retrieved Mar. 12, 2015, 2 pages.
Introduction, Apple Inc., https://developer.apple/library/ios/documentation/NetworkingInternet/Conceptual/StreamingMediaGuide/Introduction/Introduction.html, retrieved Dec. 10, 2015, 3 pages.
MPEG transport system, Wikipedia, Inc., http://en.wikipedia.org/wiki/MPEG_transport_stream, retrieved Mar. 12, 2015, 9 pages.
Revolutionize Your Content, SnappyTV, http://www/snappytv.com/corp/index.html, retrieved Dec. 10, 2015, 6 pages.
Experience TiVo BOLT, TiVO Discover, https://www.tivo.com/discover, retrieved Dec. 10, 2015, 5 pages.
Inroducing Xbox SmartGlass, Microsoft, http://www.xbox.com/en-US/smartglass, retrieved Dec. 10, 2015, 4 pages.

* cited by examiner

FIG. 3 http://www.comcast.com/vclip?pid=1234567&s=053423&e=065715&cid=9876543

*FIG. 4*

DATA SEGMENT SERVICE

CROSS-REFERENCE TO RELATED APPLICATIONS

This application is a continuation of and claims priority to U.S. patent application Ser. No. 17/947,736, filed on Sep. 19, 2022, which is a continuation of Ser. No. 13/617,433 (now U.S. Pat. No. 11,451,736), filed Sep. 14, 2012, which is a divisional of U.S. patent application Ser. No. 12/964,046, filed Dec. 9, 2010 (now U.S. Pat. No. 10,057,535), each of which is hereby incorporated by reference in its entirety.

FIELD

Aspects of the disclosure relate to the delivery of media content over a network. More specifically, aspects are directed to identification and/or extraction of a selected video clip from a multimedia program.

BACKGROUND

Web sites and services such as YouTube® have given users the ability to upload and share media content. However, often content that a user desires to share is not available for sharing or is not in a format suitable for sharing. For example, as people watch shows or movies on television they may see a scene that they want to share with friends or family, or that they want to post to a blog or social networking site. However, in order to share a video clip a user may need to capture the video using a card in a PC. Once the video is captured, the user may still have to edit the video to the desired length with one of many video editing software programs, such as I-movie. However, not all users have the capability to capture or edit video input with suitable video editing software. In addition, most media editing software may be cumbersome and difficult to use, providing too many confusing features for average users.

Alternatively, a user may attempt to share a video clip by searching on networks such as the Internet to see if someone else has already uploaded the desired video clip. However, if content is first available, such as a show is playing on television for the very first time, the likelihood of finding a video clip immediately available on the Internet is low, because such a method relies on someone else already having captured and uploaded the video to a video hosting service, such as YouTube®. If the video has already been captured and uploaded by someone else, then the user can share a link to the previously uploaded version. However, often the uploaded version is not the exact clip the user desires to share (e.g., because it ends too quickly, before panning the crowd in which the user would have been seen), or might not have a good enough image quality as desired by the user (e.g., might only be VGA or standard definition TV instead of HDTV).

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to the delivery of media content over a network. Specifically, aspects are directed to identification and/or extraction of a selected data segment such as a video clip from a multimedia program, and providing identifying information to a user to retrieve, view, and/or share the selected video clip. Aspects described herein provide the ability to identify a starting point and stopping point of a video clip on a media gateway device (e.g., set top box, DVR, etc.) and translate the start and stop information into a URL that can be used to access and/or share the selected video clip. The URL may identify a stored media clip, or may contain information from which a video clip can be recreated.

Some aspects described herein provide methods and systems that receive content via a network and output the content for display on a display device; receive first input from a user and, responsive to said first input, enter an edit mode; determine a beginning of a data segment; determine an end of the data segment; and send a data segment definition message to a server identifying the first media program, the beginning, and the end of the data segment.

Other aspects described herein provide methods and systems for receiving a video clip definition message from a gateway device; automatically creating a network address corresponding to a video clip defined by the video clip definition message, wherein the video clip is less than an entire media program on which the video clip is based; and automatically sending the network address to a user associated with the video clip definition message.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
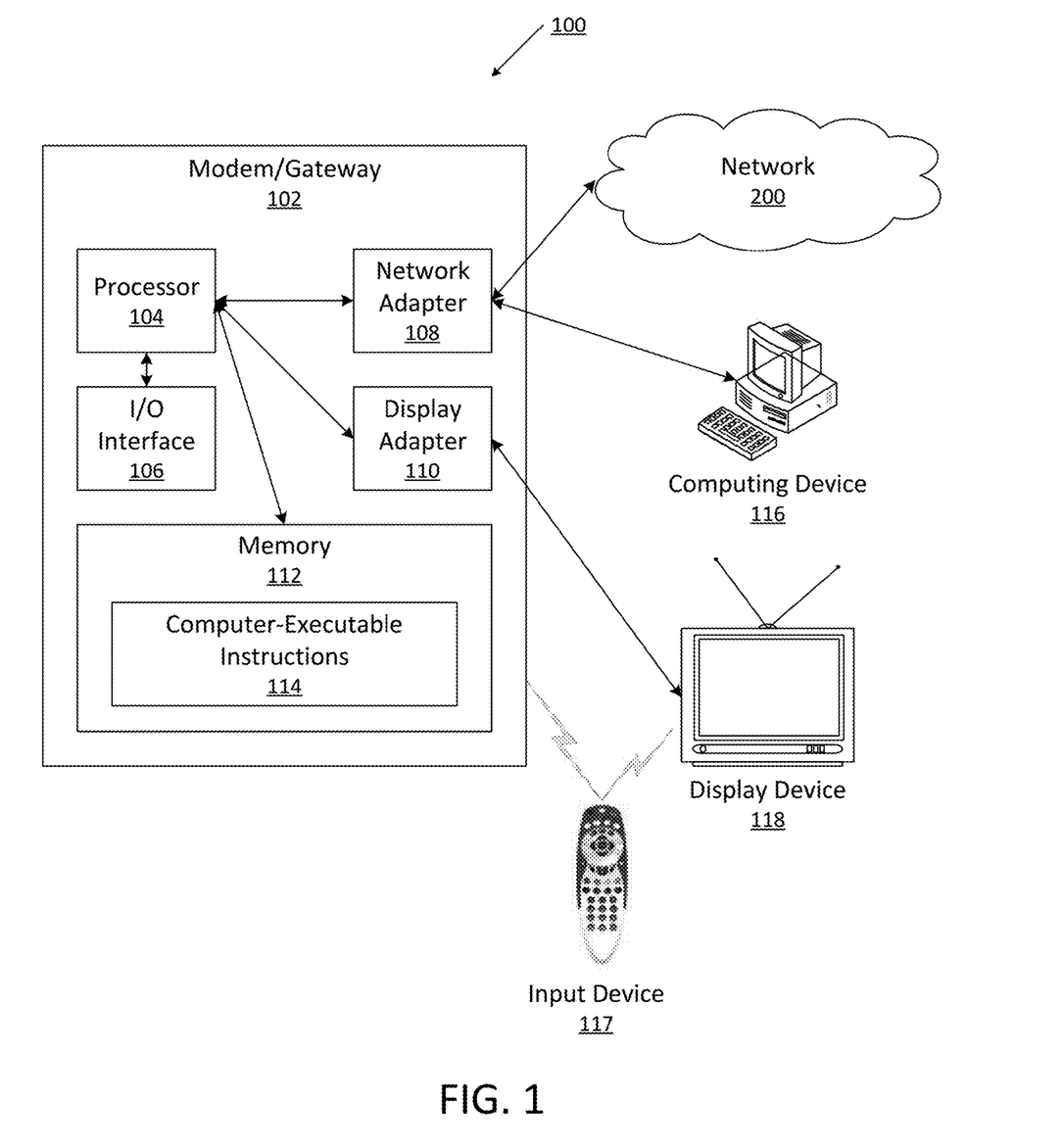
FIG. 1 illustrates an example operating environment according to one or more illustrative aspects described herein.

FIG. 1 illustrates an example operating environment according to one or more aspects described herein. In one or more arrangements, operating environment 100 may include a receiving device 102, such as a modem or gateway device. Gateway 102 may comprise, for example, one or more components or functionalities of cable modems, optical interface devices, set-top boxes (STBs), and/or digital video recorders (DVRs), and may include a plurality of communicatively coupled components which may enable gateway 102 to perform a variety of functions. For example, gateway 102 may include a processor 104 that may be configured to store and/or execute computer-readable and/or computer-executable instructions (e.g., software), thereby adapting the gateway 102 to perform one or more features, actions, or processes described herein. Additionally or alternatively, processor 104 may control other components included in gateway 102, such as those described below.

In at least one arrangement, gateway 102 may include an input/output interface 106, which may enable gateway 102 to receive input from a user directly or via an input device 117 (e.g., remote control, keyboard, mouse, touch pad and/or stylus, touch screen, etc.). Gateway 102 further may include a network adapter 108, which may enable gateway 102 to connect to one or more computing devices (e.g., computing device 116) and/or one or more networks (e.g., a distribution and/or access network 200; a local area network ("LAN"); and/or a wide area network ("WAN"), such as the Internet). Network adapter 108 may implement one or more wired and/or wireless communication protocols, such as ETHERNET, IEEE 802.11, BLUETOOTH, HTTP, TCP/IP, MoCA (Multimedia over Coax Alliance), and/or the like. Additionally or alternatively, network adapter 108 may enable gateway 102 to transmit and/or receive electronic signals over a network such as a hybrid fiber/coaxial cable (HFC) network, a fiber optic network, a satellite network, a digital subscriber line (DSL) network, a wireless network, and/or the like.

In one or more arrangements, gateway 102 also may include a display adapter 110, which may enable gateway 102 to transmit and/or receive electronic signals to and/or from a display device, such as display device 118. Additionally or alternatively, gateway 102 may include memory 112, which may store computer-executable instructions 114. By executing one or more of the computer-executable instructions 114 stored in memory 112, processor 104 may cause gateway 102 to perform one or more methods described herein. In one or more configurations, other computing devices described herein may include similar components connected in similar ways. Accordingly, such other computing devices may provide similar functionalities and have similar capabilities. Among other things, such other computing devices may include one or more processors and/or one or more memories storing computer-executable instructions that, when executed by one or more processors, cause such devices, either alone or in combination, to perform one or more methods described herein. Moreover, in at least one arrangement, gateway 102 may be implemented as one or more hardware and/or software components included in another device (e.g., computing device 116).

Figure 2:
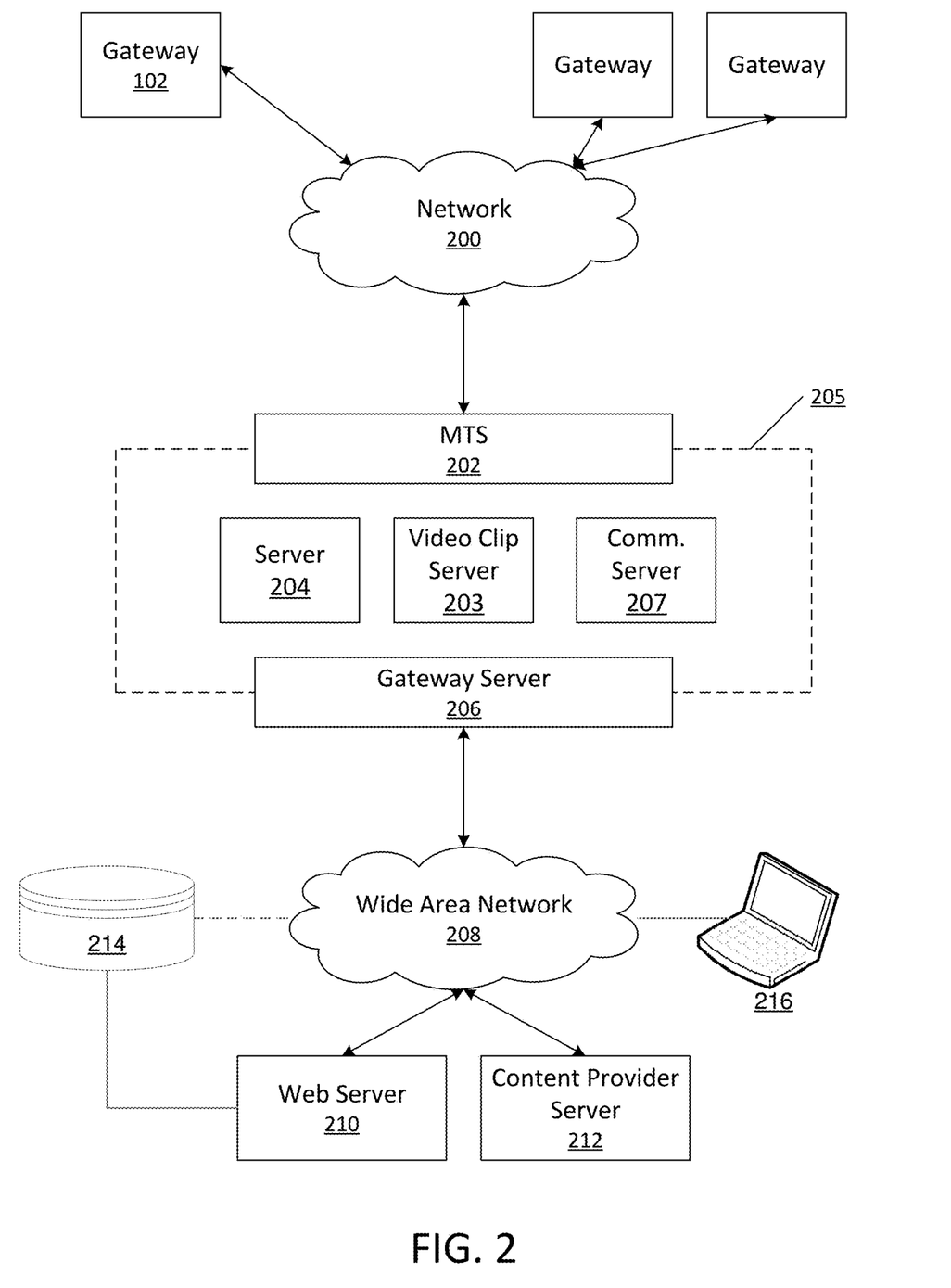
FIG. 2 illustrates an example network environment according to one or more illustrative aspects described herein.

FIG. 2 illustrates an example network environment according to one or more aspects described herein. As described above with respect to FIG. 1, and as may be seen in FIG. 2, gateway 102 may be communicatively linked to a distribution and or/access network, such as network 200. Network 200 may include one or more wireless, coaxial cable, optical fiber, hybrid fiber/coaxial (HFC) cable, cellular, satellite, WiMax, and/or other connections, which may facilitate communication between a server 205 (e.g., a computing system, a headend, a content distribution center, a central office, etc.) and one or more gateways (e.g., gateway 102). For example, distribution network 200 may include a series of communication links, such as wireless links, cables and splitters, leading from a server 205 to various premises such as homes in a neighborhood. In an HFC type network, some or all of these communication links may be a combination of fiber optical and coaxial links. Additionally or alternatively, some or all of these communication links may be wireless.

In one or more arrangements, gateway 102, and/or the other one or more gateways that may be connected to distribution network 200, may include an interface device that is configured to receive content from the server 205 (e.g., a computing system, a headend, a content distribution center, a central office, etc.), as well as processing circuitry to convert the content into a format for consumption by a user of one or more consumption devices that may be communicatively connected to the one or more gateways. The content may include any desired type of information or data, such as video content, audio content, Internet Protocol data, and/or television programming. The one or more consumption devices may include one or more televisions, high-definition televisions (HDTVs), monitors, host viewing devices, MP3 players, audio receivers, radios, communication devices, personal computers, media players, digital video recorders, game playing devices, smart phones, and/or the like. Additionally or alternatively, one or more consumption devices may be implemented as a transceiver having interactive capability in connection with a gateway (e.g., gateway 102) and/or a server (e.g., server 205).

According to one or more aspects, a gateway (e.g., gateway 102) may provide a user with access to a public or remote local area network or wide area network (e.g., wide area network 208, which may include the Internet), as well as various other devices included in such networks, such as web server 210, content provider server 212, and/or other computers 216. Content received at gateway 102 may be supplemented and/or customized by data obtained via networks such as the wide area network 208. The gateway (e.g., gateway 102) also may enable on-premises communication among devices at the user's locations, such as one or more routers, televisions, computers, and/or the like. Additionally or alternatively, gateway 102 may route data received and/or transmitted via distribution network 200 to one or more devices at the user's location.

In one or more configurations, the gateways 102 may include, for example, one or more components or functionalities of cable modems, optical interface devices, set-top boxes (STBs), and/or digital video recorders (DVRs). Thus, the network environment may be used as a media service provider/subscriber system in which a provider and/or vendor may operate the server 205 (e.g., one or more headends, content distribution centers, central offices, etc.) and/or the distribution network 200, and the provider and/or vendor further may provide a user (e.g., a subscriber, client, customer, service purchaser, etc.) with one or more receiving devices (e.g., gateway 102). In at least one configuration, the user may provide and/or use his or her own gateway and/or receiving device(s).

In one or more arrangements, the network environment further may include one or more servers 205. Each server 205 may include a plurality of logical and/or physical devices and/or components, such as other data servers (e.g., servers 203, 204, 207), computers, processors, memories, data storage devices (e.g., hard drives), security encryption and decryption apparatuses, and/or the like. In at least one arrangement, server 205 may comprise a server cluster, data center, central office, and/or the like, and in such an arrangement, server 205 may include additional servers (e.g., server 203, 204, 207). In one configuration, such as an HFC-type system, one or more devices in each server 205 may comprise a Termination System and/or a Termination Server (TS) 202, such as an Modem Termination System and/or Cable Modem Termination Server that may facilitate communication between each server 205 and one or more gateways (e.g., gateway 102).

According to illustrative aspects, server 205 may include for example, a video clip server 203 and a communication server 207. Video clip server may be configured or adapted to receive user input (e.g., via gateway 102). Such input may be identifying the beginning and end of a portion or segment of data, e.g., a video clip, of interest to the user, e.g., by receiving and/or transmitting starting and stopping times, offsets, positions, coordinates, or other information from which a specific video clip can be determined or recreated for a particular program. Video clip server may also create a uniform resource locator (URL) from which the video clip can be viewed and/or shared. Video clip server 203 may be the same as or a different server that stores and provides media content to the gateway for initial display to the user based on user input events (e.g., changing television channels, etc.).

Communication server 207 may be configured or adapted to send the URL to the user so the user can view or share the video clip with others.

In one or more arrangements, each server 205 also may be connected to one or more public or private local networks (not shown) and/or wide area networks (e.g., wide area network 208, which may include the Internet) via a network gateway server 206. Additionally or alternatively, via wide area network 208, each server 205 may be able to access other devices connected to wide area network 208, such as web server 210 (which may, for example, host one or more websites, such as YouTube®) and/or content provider server 212 (which may, for example, store and/or provide content, such as audio, video, or audiovisual programming).

In one or more arrangements, a gateway (e.g., gateway 102) may receive programming (e.g., television programming via a transport stream transmitted over network 200, such as an electronically transmitted MPEG transport stream), and a connected display device (e.g., display device 118) may display such programming. In at least one arrangement, such programming may include video on-demand (VOD) programming. Additionally or alternatively, such programming may include one or more captions and/or enhanced captions, as further described below.

Figure 3:
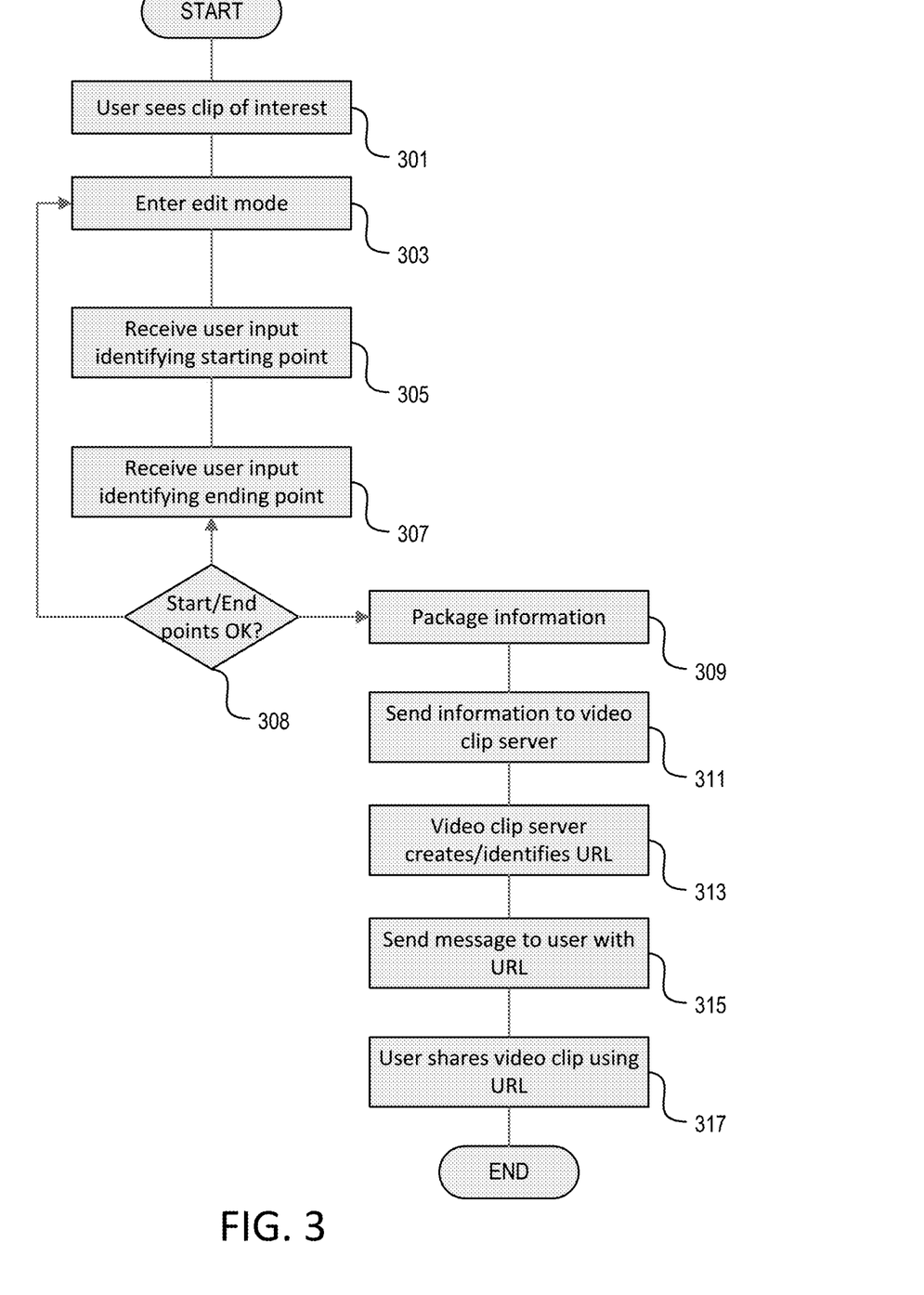
FIG. 3 illustrates a method of generating a video clip according to one or more illustrative aspects described herein.

FIG. 3 shows an illustrative method of a sample use-case scenario where a user identifies a video clip of interest and shares that video clip with one or more other people. In the present example, the user's gateway device (e.g., a set-top box), includes digital video recording (DVR) capabilities, such as buffering, rewinding, and the like. Initially, in step 301, the user is watching a media program, e.g., a television show, movie, or the like, such as on display device 118 using gateway 102, when the user sees a video clip that the user wants to save for later use and/or share with another person. In step 303 the gateway receives user input, e.g., using remote control 117, indicating the user's intent to specify a video clip starting and stopping point. Gateway 102, upon receiving the user input, enters an editing mode. In this illustrative use case, gateway 102, upon entering editing mode, provides a user interface through which the user can move forward and rewind the currently playing media program, e.g., from its current location, to identify starting and stopping points of a video clip or a portion of data.

Once in the editing mode, the user may specify the beginning or starting point of the clip in step 305. The user may specify the starting point, e.g., by slowly rewinding the currently playing media program until a desired starting position is reached, and then providing predetermined user input specifying the start point. In one illustrative example, the user may use a rewind button on a remote control to slowly reverse the presently playing media program, and then the user may press a "select" or "enter" button on a remote control to indicate the starting position. In this use case example, gateway 102, upon entering clip edit mode, may enter a state in which gateway 102 expects to receive a clip starting point, and interprets user input accordingly. Alternatively, upon entering the edit mode, the gateway may automatically select the starting position to correspond to a point in time in the media program when the user provided input to enter the editing mode.

Upon receiving the video clip starting position, gateway 102 in step 307 enters a state in which gateway 102 awaits user input identifying the end of the desired video clip. The user may use a fast-forward button to advance (frame-by-frame, fast-forward, etc.) to a desired end of the video clip. The user may then press a "select" or "enter" button on a remote control, which gateway 102 may interpret as identifying the ending position. Other forms of user input may be used. For example, upon selecting the starting position, gateway 102 may playback the media program at normal speed, and the user can simply press the "enter" or "select" when the media program is at a point that the user decides would be a good ending point for the video clip. Any form of user input may be used that identifies a start and an end for a desired video clip.

According to an illustrative aspect, gateway 102 may enforce a maximum length of a video clip, e.g., to enforce fair use under copyright law, and/or to enforce any restrictions desired by a content owner. In one example, a video clip (or another type of data segment) might not be allowed to exceed a predetermined amount of time, e.g., 2 minutes. In another example, a video clip might not be allowed to exceed a predetermined length based on the length of the media program, e.g., no more than 2 minutes for a 30 minute show; no more than 4 minutes for a 1 hour show, etc. In yet another embodiment, a video clip might not be allowed to exceed a predefined percentage of a program, e.g., video clip not to exceed 5% of length of media program. In still another embodiment, the content owner of the media program may specify any restrictions on creating media clips from that program, e.g., no media clips allowed; only 1 media clip per user; maximum length of media clip is 3 minutes; etc. Content owners may provide restrictions for individual programs, genres of programs, based on lengths of programs, etc., and these restrictions may be stored in a content owner restrictions database (not shown) that is communicatively coupled to gateway 102. That is, gateway 102 may query the content owner restriction database based on the program ID to determine whether any such content restrictions exist.

If gateway 102 has not received user input to end a video clip prior to the maximum allowed length, gateway 102 may automatically end the video clip when the maximum allowed length is reached.

Once the user has selected the start and end points of a video clip (or another type of data segment), gateway 102 may provide the user the opportunity to playback and confirm the video clip starting and ending points. If the user does not approve the video clip in step 308, then gateway 102 may reenter video clip edit mode for the user to re-specify the start and/or stop of the video clip.

When the user does approve the start/end points of the video clip in step 308, then in step 309 the gateway 102 packages the clip information for sending to video clip server 203 (or a computing device for hosting another type of data segment) in step 311, where the clip information may include a program ID, start time, end time, and user ID. The program ID may be a specific media program identifier that uniquely identifies a show and episode, or the program ID may be a device ID (e.g., the ID corresponding to the gateway or STB used to create the clip) and a channel code or number. The user ID may identify the gateway 102, a user associated with gateway 102, or both. For example, where the user ID may identify the gateway 102, the video clip server 203 may query a user database to determine a user responsible for that gateway, as well as determine any contact information for that user, for use as further described herein.

According to various aspects, gateway 102 may package the clip information using a variety of information. Start and end times or timestamps may include either an internal program time stamp or a network time as communicated to the gateway 102. In one aspect, when gateway 102 includes digital video recorder (DVR) capabilities, the user may be selecting a video clip while playing back a recorded program. In such a case, and if the network time is used, the DVR may store the network time as a reference for the creation of video clips.

In one aspect, gateway 102 may identify a clip using a channel number/ID (e.g., content service or network, such as HBO, HBO2, ABC, channel 35, network 123456, etc.) and a start and stop date and time (e.g., channel 23; start: 9:53:12 AM; end: 9:53:55 AM). In another aspect, gateway 102 may identify a clip using a unique program code and a start and stop time, where the start and stop times are offsets from the beginning of the program (e.g., program ID: 1234567; start: 3 min. 37 sec; end: 4 min. 15 sec.). Other combinations of data may also or alternatively be used, provided the data uniquely identifies a video clip within a particular program. Gateway 102 sends the clip information to video clip server 203, along with an identification of the user. Table 1, below illustrates an example of video clip definition message contents sent by gateway 102 in step 311 to video clip server 203 according to an illustrative aspect where time offsets are used to specify start and end times, and a unique program ID that identified a program and/or episode is used to identify a specific media program:

TABLE 1

| video clip definition message | |
|---|---|
| Field | Data |
| Program ID | 1234567 |
| Start | 05:34.23 |
| End | 06:57.15 |
| Customer ID | 9876543 |

Upon receipt of the video clip information video clip server 203 in step 313 maps the program ID (or other information) to its associated media file. Video clip server 203 may extract a video clip from the media file based on the start and stop timestamp information, and sends the video clip to media clip storage device 214. Video clip server 203 also creates or identifies a network address (e.g., a uniform resource locator, or URL) pointing to the stored media clip. In step 315, the communication server 207 sends, e.g., by email, instant message, overlay on display screen 118, etc., a message to the user indicating the network address (e.g., the URL, or some other address) at which the media clip is stored. Communication server 207 may identify a user address based on the user ID, e.g., by sending to an associated email address, phone number, or gateway device.

In step 317 the user can insert the received network address into an e-mail and send the email to one or more other people. Alternatively, the user may upload the video content to a social media web site, e.g., by providing the network address to the social media web site for posting on the user's account. When a recipient receives a communication with the URL, the recipient may follow the URL to the specified networks, e.g., Internet address to view the video clip. The web server to which the URL is directed may analyze variables within the URL to display or recreate the desired video clip.

Figure 4:
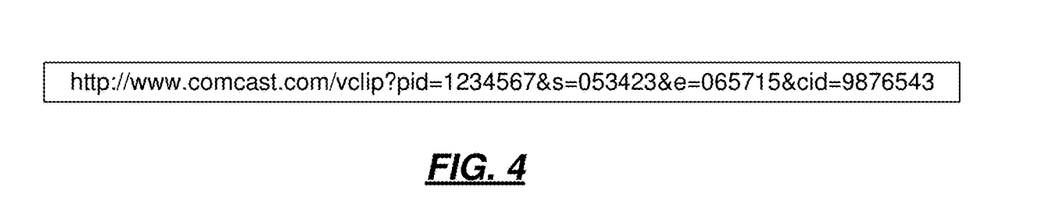
FIG. 4 illustrates a URL according to one or more illustrative aspects described herein.

The above method is but one illustrative method, and others may also or alternatively be used. For example, instead of sending a video clip definition message (as shown in Table 1), a gateway device 102 may send the actual data segment (e.g., the actual video clip) to server 203. Gateway device 102 may package the actual edited data segment with information about the user, gateway device, and the program from which the data segment was obtained, and provide all information server 203, thereby minimizing the work would otherwise need to be performed by server 203 to recreate the video clip as defined by the user. As another example, instead of saving every media clip in storage 214 (regardless of whether server 203 received media clips from each gateway device 102 or recreated media clips based on clip definition messages), a web server may recreate video clips on-demand based on the video clip definition message or URL, thereby reducing the amount of individual video clips that are permanently stored. For example, each media program might only be stored once, and every video clip created based on that program may be recreated "on the fly" based on the video clip definition message or URL. An illustrative example of a URL that may be used to create a video clip on demand based on the information in Table 1 is shown in FIG. 4. Upon receiving the URL shown in FIG. 4, the video clip hosting service may automatically clip the requested program according to the received information, and present the clip for display to the user. In such an example, the user ID may be optional, or may be used to identify the user who initially requested creation of the particular clip.

According to another use case scenario, a user, while watching a live program on a gateway not having DVR capabilities, may select a Video Editing mode while watching TV, e.g., using a remote control device. Because no DVR capabilities are present in the gateway, the gateway may automatically start the video clip upon receipt of the user input. Stated differently, where the gateway has no media buffer, the starting position of the video clip may be identified based on the point in time in the program at which the user provides input to enter the video clip selection/edit mode. As the program continues to play, the user may provide a second user input at the desired end location. Fair use considerations (i.e., condition under which data segment clips may be created with authorization of the copyright holder) may again be considered as in the previous example, or the gateway might automatically end the video clip might after a specified amount of time has elapsed without further input from the user.

Because the gateway does not include DVR capabilities in this example case, the start and stop times might not actually be the intended start and stop positions, although they will likely at least be close to the user's desired start and stop position. Upon providing the program, start, stop and user ID information to the video clip server 203, video clip server (or another device) generates a URL as described above.

According to an illustrative embodiment, the user may be able to edit the video clip via the URL. That is, when the user creates a video clip through a gateway not having DVR capabilities, the user may desire to edit the video clip to start and stop the video clip at slightly different locations. Video clip server 203 is adapted to send the URL and/or video content to web server 210 and database 214. The user, upon navigating a network browser to the URL, is provided a video edit screen by web server 210, through which the user can alter the start and stop positions of the video clip. In some embodiments the user may be able to arbitrarily edit the start and stop positions. In other embodiments the user might only be allowed to move the start and stop positions by a limited amount of time (e.g., plus or minus one minute, 30 seconds, etc.) or by a variable limited amount based on the length of the clip or the based on the length of the show from which the clip was pulled (e.g., plus or minus 1%, 5%, 10%, etc.). The web server may provide a new URL to the user, if necessary, based on the revised video clip information.

According to an aspect, when the user initially provides user input to start a video clip, the gateway may first determine if the media for the program is being stored in the network. That is, the video clip feature described herein might only be available if the media is being stored somewhere in the network. If the media is not stored on the network, and the user's gateway does not include DVR capabilities, then the user might not be able to take advantage of the video clip feature(s) described herein. Alternatively, gateway 102 may enter a first video editing mode when the media for the program is stored in the network, and may enter a second video editing mode when the media for the program is stored in a DVR associated with the gateway. The first editing mode may define and send a video clip definition message described in Table 1, whereas the second video editing mode may send an actual video clip to video clip server 203 based on the start and stop times defined by the user.

Using one or more features described herein, a media distributor can sign up and retain customers or users by providing valuable service differentiating capabilities from other media distributors. Content providers benefit by simplifying the process of video capture and sharing, thereby expediting or accelerating viral growth of a show's popularity. That is, creation and sharing of video clips, or other data segments, is a promotional opportunity for content providers, whereby users effectively do the advertising on behalf of the content provider by sharing media clips with other users. In addition, content providers can specify the terms under which video clips are created, thereby retaining control of content and defining the terms of fair use. If the terms of use defined by a content provider are not egregious and the process of capturing and/or editing video is easy for users, one can expect a natural migration of content capture over to a network or content provider web site as a location to view the content, therefore simplifying intellectual property concerns around content sharing. Stated differently, the URL generated by the video clip server may direct the user to an official web site of the content owner, thereby driving traffic to an entity authorized to perform and display the copyrighted work to the public, regardless of fair use concerns.

Thus, according to an illustrative aspect, a user may capture or edit a video clip, for example, while watching live TV or a program recorded on a DVR. Upon specifying the start and stop positions for the video clip, the video clip server may send the user a custom URL that points to the copyright owner's own web site, with appropriate variables or other information in the URL so that, when the resulting web page loads, the specified video clip is played back to the user. The URL may further indicate a user ID to track which user originally requested creation of the video clip, regardless of whether the creating user forward the URL to one or more other people. The copyright owner's web site may also monitor or determine, based on the various URLs the web site/web server receives with video clip information, which portion of each program are the most popular. The webs site, based on review and analysis of the various URLs, may provide a ranking or list of popular shows and/or video clips.

The copyright owner's web site (or other authorized distributor of the media) may further provide additional offers and/or services to the user viewing the media clip. According to one illustrative example, the copyright owner's web site might provide the ability for the user to watch the entire program from which the media clip was taken. Alternatively, the web site might provide the user the ability to rent or purchase the media program, or other associated content such as music from the media program, graphics, ringtones, desktop wallpaper, etc.

In addition to the above, online media providers may further benefit from additional content uploaded to a media web site, e.g., by receiving additional revenue based on the additional content. Advertising on a web page through which the video clip is played back for a user is increased based on the influx of new content. Online media providers may also benefit from increased traffic to their web site, generally.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions, e.g., stored in a tangible storage media. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. In addition, the above described methods and system may be usable with audio clips as well as with video clips.

The invention claimed is:

1. A method comprising:
   receiving, by a computing device, first input information indicating first user input associated with a content item;
   determining, based on the content item and the first input information, a media clip that comprises a portion of the content item;
   generating a first uniform resource locator;
   receiving a request to access the first uniform resource locator;
   receiving second input information indicating second user input associated with the media clip;

determining, based on the second input information, a modified version of the media clip; and generating, based on the modified version of the media clip, a second uniform resource locator.

2. The method of claim 1, wherein the first input information indicates first user input that was entered at a first device at a first time during an output, by the first device, of the content item.

3. The method of claim 1, wherein:
the first input information indicates first user input that was entered at a first device at a first time during an output, by the first device, of the content item; and
the second input information indicates second user input that was entered at the first device.

4. The method of claim 1, wherein the second input information indicates one or more of:
a modified start time for the media clip;
a modified end time for the media clip; or
a modified duration of the media clip.

5. The method of claim 1, wherein the first uniform resource locator comprises clip definition information indicating the media clip.

6. The method of claim 1, wherein the first uniform resource locator comprises:
a program identifier,
a start timestamp, and
an end timestamp.

7. The method of claim 1, wherein the second input information further comprises a user identification associated with the second user input, and the method further comprising:
determining a network address based on the user identification; and
sending, by the computing device and to the network address, the second uniform resource locator.

8. A method comprising:
receiving, by a computing device, first input information indicating a first user input associated with a content item;
sending, by the computing device and to a first device, the first input information;
receiving, by the computing device and from the first device, a first uniform resource locator associated with a media clip that comprises a portion of the content item;
sending the first uniform resource locator;
sending second input information indicating second user input associated with the media clip; and
receiving a second uniform resource locator associated with a modified version of the media clip.

9. The method of claim 8, wherein the first input information indicates first user input that was entered at the first device at a first time during an output, by the first device, of the content item.

10. The method of claim 8, wherein:
the first input information indicates first user input that was entered at the first device at a first time during an output, by the first device, of the content item; and
the second input information indicates second user input that was entered at the first device.

11. The method of claim 8, wherein the second input information indicates one or more of:
a modified start time for the media clip;
a modified end time for the media clip; or
a modified duration of the media clip.

12. The method of claim 8, wherein the first uniform resource locator comprises clip definition information indicating the media clip.

13. The method of claim 8, wherein the first uniform resource locator comprises:
a program identifier,
a start timestamp, and
an end timestamp.

14. The method of claim 8, wherein the first input information further comprises a user identification associated with the first user input, and the method further comprising:
causing the first device to send the second uniform resource locator to a network address based on the user identification.

15. A computing device comprising:
one or more processors; and
memory storing instructions that, when executed by the one or more processors, configure the computing device to:
receive first input information indicating first user input associated with a content item;
determine, based on the content item and the first input information, a media clip that comprises a portion of the content item;
generate a first uniform resource locator;
receive a request to access the first uniform resource locator;
receive second input information indicating second user input associated with the media clip;
determine, based on the second input information, a modified version of the media clip; and
generate, based on the modified version of the media clip, a second uniform resource locator.

16. The computing device of claim 15, wherein the first input information indicates first user input that was entered at a first device at a first time during an output, by the first device, of the content item.

17. The computing device of claim 15, wherein:
the first input information indicates first user input that was entered at a first device at a first time during an output, by the first device, of the content item; and
the second input information indicates second user input that was entered at the first device.

18. The computing device of claim 15, wherein the second input information indicates one or more of:
a modified start time for the media clip;
a modified end time for the media clip; or
a modified duration of the media clip.

19. The computing device of claim 15, wherein the first uniform resource locator comprises clip definition information indicating the media clip.

20. The computing device of claim 15, wherein the first uniform resource locator comprises:
a program identifier,
a start timestamp, and
an end timestamp.

21. The computing device of claim 15, wherein the second input information further comprises a user identification associated with the second user input, and the instructions, when executed, further configure the computing device to:
determine a network address based on the user identification; and
send, to the network address, the second uniform resource locator.

22. A computing device comprising:
one or more processors; and memory storing instructions that, when executed by the one or more processors, configure the computing device to:
  receive first input information indicating a first user input associated with a content item;
  send, to a first device, the first input information;
  receive, from the first device, a first uniform resource locator associated with a media clip that comprises a portion of the content item;
  send the first uniform resource locator;
  send second input information indicating second user input associated with the media clip; and
  receive a second uniform resource locator associated with a modified version of the media clip.

23. The computing device of claim 22, wherein the first input information indicates first user input that was entered at the first device at a first time during an output, by the first device, of the content item.

24. The computing device of claim 22, wherein:
  the first input information indicates first user input that was entered at the first device at a first time during an output, by the first device, of the content item; and
  the second input information indicates second user input that was entered at the first device.

25. The computing device of claim 22, wherein the second input information indicates one or more of:
  a modified start time for the media clip;
  a modified end time for the media clip; or
  a modified duration of the media clip.

26. The computing device of claim 22, wherein the first uniform resource locator comprises clip definition information indicating the media clip.

27. The computing device of claim 22, wherein the first uniform resource locator comprises:
  a program identifier,
  a start timestamp, and
  an end timestamp.

28. The computing device of claim 22, wherein the first input information further comprises a user identification associated with the first user input, and the instructions, when executed, further configure the computing device to:
  cause the first device to send the second uniform resource locator to a network address based on the user identification.

* * * * *